United States Patent [19]
Rigney

[11] Patent Number: 5,196,748
[45] Date of Patent: Mar. 23, 1993

[54] LAMINATED MAGNETIC STRUCTURE FOR SUPERCONDUCTING BEARINGS

[75] Inventor: Thomas K. Rigney, Torrance, Calif.

[73] Assignee: Allied-Signal Inc., Morris Township, Morris County, N.J.

[21] Appl. No.: 846,647

[22] Filed: Mar. 5, 1992

Related U.S. Application Data

[63] Continuation-in-part of Ser. No. 753,760, Sep. 3, 1991.

[51] Int. Cl.$^5$ .............................................. H02K 7/09
[52] U.S. Cl. .................................... 310/90.5; 505/727
[58] Field of Search ................... 310/90.5, 156, 254; 505/1, 876, 700, 727

[56] References Cited

U.S. PATENT DOCUMENTS

| | | | |
|---|---|---|---|
| 3,233,950 | 2/1966 | Baermann | 310/90.5 |
| 3,378,315 | 6/1965 | Webb | 310/90.5 |
| 3,614,181 | 7/1970 | Meeks | 308/10 |
| 3,958,842 | 5/1976 | Telle | 308/10 |
| 4,072,370 | 2/1978 | Wasson | 308/10 |
| 4,443,043 | 4/1984 | Yamaguchi | 308/10 |
| 4,797,386 | 1/1989 | Gyorgy et al. | 505/1 |
| 4,892,863 | 1/1990 | Agarwala | 505/1 |
| 4,939,120 | 7/1990 | Moon et al. | 505/1 |
| 4,956,571 | 9/1990 | Gordon et al. | 310/90.5 |

OTHER PUBLICATIONS

An AC-Electromagnetic Bearing, Dr. Jorgen L. Nikolajsen Superconducting Meissner Effect Bearings for Cryogenic Turbomachines, Defense Technical Information Center.
Superconducting Bearing and Levitation Newsletter.

Primary Examiner—Steven L. Stephan
Assistant Examiner—Matthew Nguyen
Attorney, Agent, or Firm—Hugh P. Gortler; Robert A. Walsh

[57] ABSTRACT

A laminated structure for a superconducting bearing includes at least two magnets stacked in opposing polarity with at least one metallic shim being disposed between adjacent magnets. The multiplicity of opposing polarity magnets causes an increase in flux density gradient and, therefore, bearing stiffness. The laminated structure for a superconducting journal bearing has annular permanent magnets that are magnetized and stacked axially. This structure is disposed within a hollow cylinder made of superconducting material. When the cylinder is made of a Type II superconducting material, the superconducting journal bearing provides support in both the radial and axial directions.

21 Claims, 2 Drawing Sheets

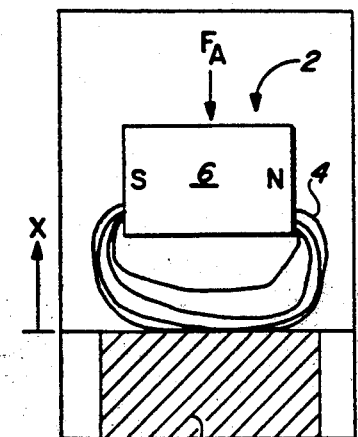 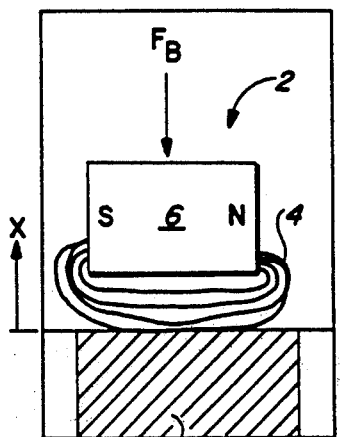 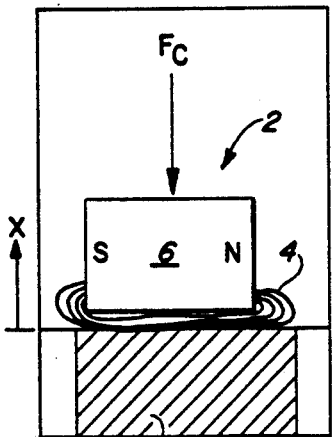
FIG_1a (PRIOR ART)    FIG_1b (PRIOR ART)    FIG_1c (PRIOR ART)
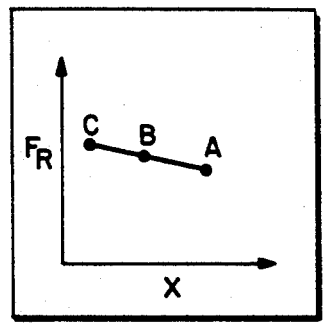
FIG_2
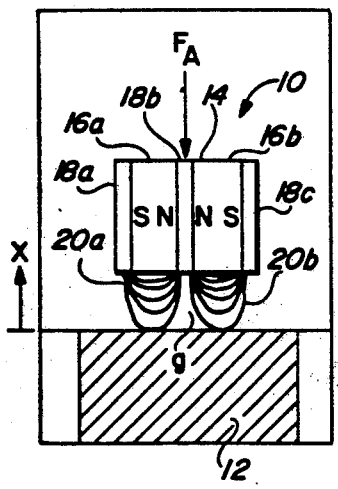 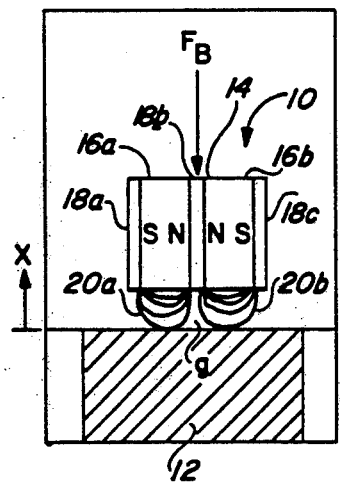 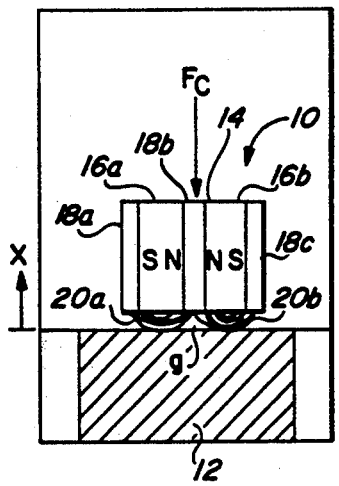
FIG_3a    FIG_3b    FIG_3c

LAMINATED MAGNETIC STRUCTURE FOR SUPERCONDUCTING BEARINGS

This invention was made with government support under contract No. N00014-88-C-0668, awarded by DARPA/ONR. The government has certain rights to this invention.

CROSS-REFERENCE TO RELATED APPLICATION

This application is a continuation-in-part of U.S. Ser. No. 07/753,760 filed on Sep. 3, 1991.

BACKGROUND OF THE INVENTION

This invention relates in general to passive magnetic bearings and in particular to superconducting bearings.

Passive magnetic bearings offer significant advantages over active magnetic bearings and conventional mechanical bearings, especially for applications requiring moderate bearing stiffness and load capacity. Passive magnetic bearings utilize inherent magnetic forces to suspend their rotors instead of contact forces or electrically-supplied forces. Operating with almost no friction, passive magnetic bearings have lower drag losses than do active magnetic and conventional mechanical bearings. Further, passive magnetic bearings do not require lubrication or bulky, complex electronics.

A conventional passive magnetic bearing is disclosed in U.S. Pat. No. 3,614,181 issued to Meeks on Oct. 19, 1972. Secured to a shaft is a first plurality of radially-polarized magnets, which are arranged in alternating polarity. Surrounding the first plurality of magnets is a second plurality of radially polarized ring magnets also arranged in alternating polarity. Uniform radial repulsive forces between the two pluralities of magnets cause the shaft to be suspended. Still, the shaft can be rotated by a minimal amount of force. However, according to Earnshaws Theorem, total permanent magnet levitation is inherently unstable and, hence, not practical for use in bearing systems.

Passive magnetic bearings can also be made of superconducting material. A thrust bearing is formed by placing a magnet above a disk made of a superconducting material cooled below its critical temperature $T_C$, and a journal bearing is formed by placing a cylindrical magnet within a hollow cylinder made of superconducting material cooled below its critical temperature $T_C$. For an example of a superconducting journal bearing, see Gyorgy et al. U.S. Pat. No. 4,797,386.

Passive magnetic bearings made of Type I superconducting materials are thought to experience rotor stability problems. Type I superconductors have the ability to exclude all or some of the magnetic flux from applied magnetic fields less than some critical field $H_C$. Known as the "Meissner Effect", this exclusion of flux is believed to be caused by persistent currents that flow at the surface of the Type I superconductor. When excluded, the flux flows around the superconductor, providing a lifting force. This lifting force causes the magnet to be levitated above the Type I superconducting disk or within the Type I superconducting cylinder. To stabilize the rotor of this Type I superconducting bearing, the bearing can generally employ either a mechanical rotor support (see, e.g., Buchold U.S. Pat. No. 3,026,151) or a dished structure that provides a gravitational minimum (see, e.g., Emaile et al. U.S. Pat. No. 3,493,274).

Magnetic bearings made of Type II superconducting materials exhibit the rotor stability lacking in the conventional magnetic and Type I superconducting bearings Type II superconductors exclude flux from applied magnetic fields less than a first critical field $H_{C1}$ and conduct flux for applied magnetic fields in excess of a second critical field $H_{C2}$. In between critical fields $H_{C1}$ and $H_{C2}$, however, Type II superconductors exhibit partial flux exclusion. Partial flux exclusion is believed to be caused by inhomogeneities (e.g., pores, inclusions, grain boundaries) inside the Type II superconductor. Some of the magnetic flux lines become "pinned" in the superconducting material while others are repelled by the pinned flux lines. This repulsion causes levitation. Thus, levitation for a Type II superconductor does not arise from the Meissner effect. Instead, levitation occurs because the Type II superconductor behaves more like a perfect conductor than a Meissner conductor.

When the magnetic field is being induced into the Type II superconductor, the superconductor offers resistance to change or displacement of the pinned flux lines. This resistance allows the bearing made from Type II superconducting material to display far greater stability than a bearing made of a Type I superconducting material. Because of their inherent stability, Type II superconducting bearings are more commonly used for rotating structures.

For the superconducting bearing 2 shown in FIGS. 1a–1c, flux lines 4 flow between poles of a dipole permanent magnet 6, which is a distance x from a member 8 made of Type II superconducting material. When cooled below its critical temperature $T_C$, the member 8 pins some of the flux lines 4. Other flux lines 4 are repelled by the pinned flux lines 4, causing the magnet 6 to be levitated above the superconducting member 8. When subjected to external loads $F_A$, $F_B$ and $F_C$, the magnet 6 is forced towards the surface of the superconducting member 8. Resulting from the interaction of flux lines 4 is a reactive, i.e., restoring, force $F_R$ which resists the motion of the magnet 6. As the external load increases, the reactive force also increases (see FIG. 2).

The bearing's load capacity is proportional to the magnet's flux density, which is defined as the amount of magnetic flux per unit area. Higher flux densities enable the bearing 2 to operate under greater loads. Load capacity can be increased by increasing flux density.

The bearing's stiffness is proportional to flux density gradient. Flux density gradient can be defined as the change of flux density from a distance x normal to the magnetic surface. It is proportional to the change in restoring force over distance x from the magnetic surface $(dF/dx)$. The slope of the line in FIG. 2 indicates the flux density gradient for the superconducting bearing 2 shown in FIGS. 1a–1c. Larger negative slopes indicate higher bearing stiffness.

High bearing stiffness is often desirable to maintain accurate rotor positioning. When the rotor is deflected from its geometric axis, it must be restored. Bearing stiffness can be increased by increasing the flux density gradient.

SUMMARY OF THE INVENTION

The flux density gradient of a passive magnetic bearing is increased by a laminated structure according to the present invention. The laminated structure comprises at least two magnet means stacked in opposing polarity and permeance means disposed between adjacent magnet means. The permeance means separates adjacent magnet means to increase the flux density gradient between adjacent magnet means. The resulting increase in flux density gradient increases the stiffness of the passive magnetic bearing. The laminated structure can be included in either the rotor or the stator of a superconducting bearing. In a superconducting journal bearing, the stator includes a hollow cylinder made of a superconducting material. The rotor includes at least two annular permanent magnets that are magnetized axially and stacked axially in opposing polarity, and at least one metallic shim disposed between adjacent magnets. The rotor is disposed within the hollow cylinder such that a longitudinal axis of the rotor is located along a longitudinal axis of the hollow cylinder.

BRIEF DESCRIPTION OF THE DRAWINGS

FIGS. 1a–1c are schematic diagrams of a superconducting bearing according to the prior art;

FIG. 2 is a graph of restoring force versus distance for the superconducting bearing shown in FIGS. 1a–1c;

FIGS. 3a–3c are schematic diagrams of a superconducting bearing according to the present invention;

DETAILED DESCRIPTION OF THE PREFERRED EMBODIMENT

Figure 4:
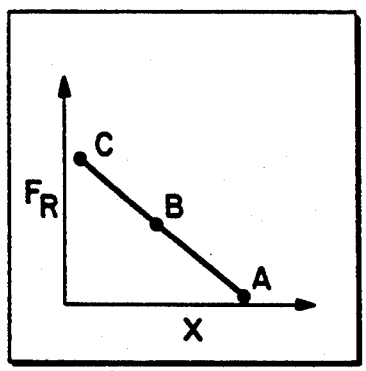
FIG. 4 is a graph of restoring force versus distance for the superconducting bearing shown in FIGS. 3a–3c.

Referring now to FIGS. 3a–3c, a bearing 10 includes a superconducting member 12 made of a melt-textured superconducting material. Although the material can be a Type I superconductor, a Type II superconductor is preferred because of its superior stability due to flux-pinning.

The bearing 10 further includes a laminate structure 14 having first and second permanent magnets 16a and 16b separated by a metallic shim 18b. Each magnet 16a and 16b is made of a rare earth material such as samarium-cobalt or neodymium-iron-boron. The magnets 16a and 16b are magnetized in an axial direction and stacked in opposing polarity such that the north poles of the first and second magnets 16a and 16b oppose each other.

The metallic shim 18b creates a path allowing magnetic flux 20a to flow between North and South poles of the first magnet 16a and magnetic flux 20b to flow between North and South poles of the second magnet 16b. When made of a high permeability metal such as mu-metal, the shim 18b can pass a greater amount of flux before becoming saturated.

More importantly, the shim 18b separates the magnets 16a and 16b, providing a gap between flux lines 20a and 20b. This gap g breaks up an otherwise long flux path between opposite ends of the structure 14, and thereby shortens the reluctance path between the North and South poles of each magnet 16a and 16b. End shims 18a and 18c help to shorten the path of flux lines 20a and 20b between the North and South poles of the magnets 16a and 16b. When an external load $F_A$ is applied to the structure 14, the flux lines are compressed and the gap g is reduced, causing the flux density to increase at the surface of the superconducting member 12. With higher external loads $F_B$ and $F_C$, the gap g is further reduced, causing the flux density to increase even further. Because the reactive force $F_R$ is proportional to the flux density, the reactive forces $F_R$ also increases in response to the increased loads $F_A$, $F_B$ and $F_C$ (see FIG. 4).

A comparison of the graphs of FIGS. 2 and 4 indicates that bearing 10 has a higher stiffness than prior art bearing 2 of similar length. Under external load $F_A$, the flux density between the surfaces of the magnets and the superconducting member of bearing 10 is lower than the corresponding flux density of prior art bearing 2, yet under higher loads $F_b$ and $F_c$, the flux density of the bearing 10 approaches the density of the prior art bearing 2. This is due to the reduction of the gap g. Thus, the laminated structure 14 of the bearing 10 has shorter flux paths and higher flux density gradients than the single magnet 6 of the prior art bearing 2.

Stiffness of the bearing 10 is determined by the number and width of magnets in the laminate structure 14. Thinner magnets allow for more gaps between flux fields. More gaps result in higher flux density gradients and, therefore, higher bearing stiffness.

Figure 5:
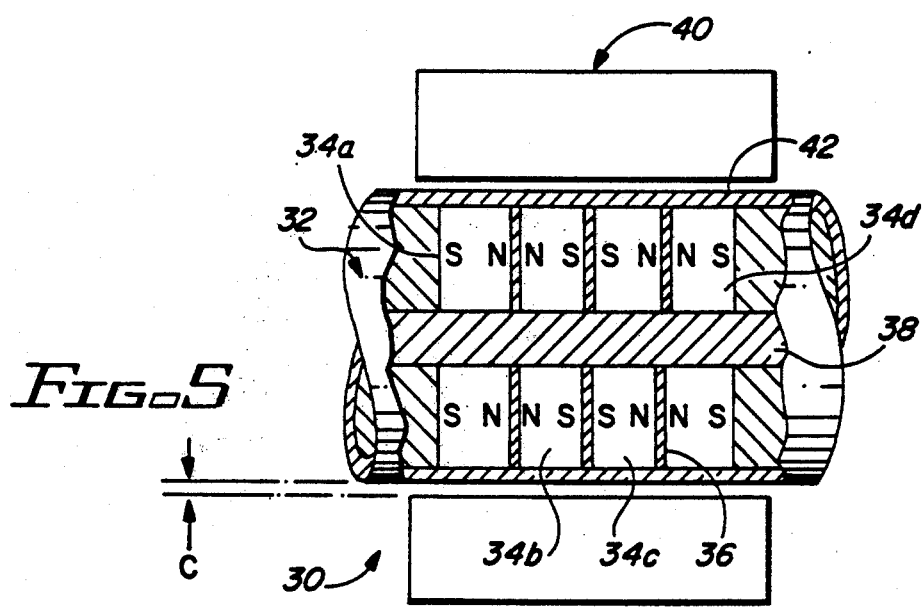
FIG. 5 is a cross-sectional view of a journal bearing according to the present invention.

Referring now to FIG. 5, a journal bearing 30 includes a rotor 32 having first, second, third and fourth annular permanent magnets 34a, 34b, 34c and 34d separated by metallic shims 36. The magnets 34a–34d are stacked in opposing polarity: the north poles of the first and second magnets 34a and 34b oppose each other, the south poles of the second and third magnets 34b and 34c oppose each other, and the north poles of the third and fourth magnets 34c and 34d oppose each other.

When the bearing 30 is used for low-speed applications, the magnets 34a–34d and shims 36 can be epoxied together by a cryogenic-rated epoxy such as "ECO-BOND 285" available from Emerson and Cummings, Inc. For high-speed applications, the magnets 34a–34d and shims 36 are attached together by a tie rod 38 made of a material having a high coefficient of permeability. The tie rod 38 extends through the longitudinal axes of the annular magnets 34a–34d. Respective ends of the tie 38 are bolted such that the annular magnets 34a–34d and shims 36 are pressed together. The ends of the tie rod 38 function as end shims.

The rotor 32 is disposed within a hollow cylinder 40 made of melt-textured $YBa_2Cu_3O_x$, a Type II superconductor. The hollow cylinder 40 functions as a stator. For the bearing to take advantage of the high flux density gradient, the magnet-to-superconductor clearance c should be less than 0.020 inches for rotors having diameters between 0.25 and 0.50 inches.

During operation, the cylinder 40 is cooled to a temperature below its critical temperature $T_C$ (93° K for $YBa_2Cu_3O_x$). As the operating temperature is decreased below the critical temperature $T_C$, the load capacity and stiffness of the bearing 30 is increased dramatically. See Weinberger, B. R. et al., *Supercond. Sci. Technol.*, Vol 3, p. 381 (1990). Liquid nitrogen cools the cylinder 40 to a temperature of 77° K. The resulting flux-pinning causes the rotor 32 to be suspended within the cylinder 40. The translation of the rotor 32 in either the axial or radial direction results in a change in the distribution of the flux pinned inside the cylinder 40. However, the Type II superconducting material resists such change. Therefore, the rotor 32 exhibits a resistance to forces applied both radially and axially. Thus, the journal bearing 30 also acts as a thrust bearing that supports radial and axial loads. It should be noted, however, that the bearing 30 provides only nominal resistance in the axial direction.

Although the rotor 32 offers resistance to axial and radial translation, it offers very low resistance to rotation. The magnetic flux lines that are pinned within the cylinder 40 are nearly symmetrical and constant for any angular position of the rotor 32. Rotation of the rotor 32 about its longitudinal axis does not alter the magnetic flux that is pinned within the cylinder 40. Thus, the cylinder 40 can be made to spin on its longitudinal axis with very little force.

A retaining sleeve 42 can be employed to hold the magnets 34a-34d in the rotor 32. The highest bearing stiffness and capacity is achieved without using the retaining sleeve 42. Therefore, the retaining sleeve 42 should be omitted for applications involving low rotational speeds. However, the stresses in the rotor 32 resulting from high rotational speeds may necessitate its use. The retaining sleeve 42 can be made of a non-ferrous, high strength metal such as beryllium copper or Inconel 718. The beryllium copper sleeve would improve the bearing damping through hysteresis at the expense of higher bearing drag losses. Alternatively, the retaining sleeve 42 can be made of high strength fibers such as filament-wound graphite or Kevlar.

Figure 6:
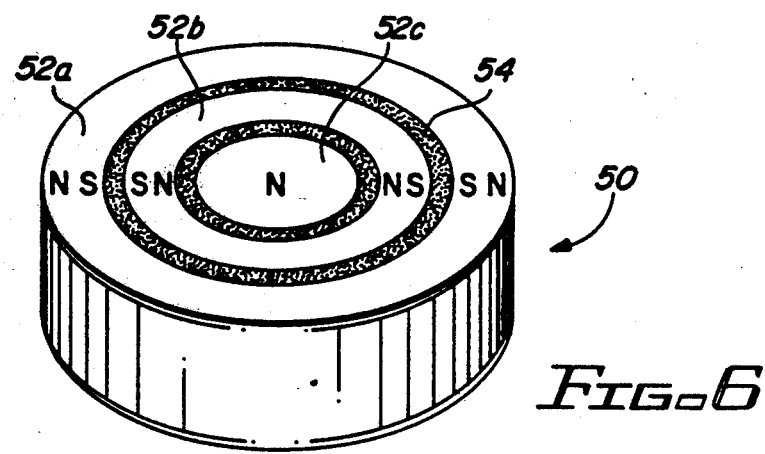
FIG. 6 is a three-dimensional view of a rotor for a thrust bearing according to the present invention.

FIG. 6 shows a rotor 50 for a thrust bearing. The rotor 50 includes three annular magnets 52a, 52b and 52c whose grains are aligned and magnetized in a radial direction. The magnets 52a-52c are stacked in opposing polarity and separated by metallic shims 54. Presently, axially-magnetized magnets are easier to manufacture than radially-magnetized magnets. Therefore, the rotors 32 for journal bearings are presently easier to manufacture than the rotors 50 for thrust bearings.

The journal and thrust bearings described in connection with FIGS. 5 and 6 are constructed with their laminate structures in the rotor. However, journal and thrust bearings according to the present invention can be constructed with laminate structures in the stators and layers of superconducting material on the rotors. If necessary, a retaining sleeve would be employed to hold the superconducting material onto the rotor.

It will be understood that the embodiments described herein are merely exemplary and that a person skilled in the art may make many variations and modifications without departing from the spirit and scope of the invention. All such modifications are intended to be included within the scope of the invention as defined in the appended claims.

I claim:

1. A laminated structure for superconducting bearings having at least one superconducting member, comprising:
   at least two magnet means stacked in opposing polarity, each said magnet means functioning to generate a magnetic field; and
   permeance means, disposed between adjacent magnet means, for separating said adjacent magnet means to increase flux density gradient between said adjacent magnet means.

2. A structure according to claim 1, wherein each said magnet means includes a permanent magnet having North and South poles, whereby either North poles of said adjacent permanent magnets oppose each other or South poles of said adjacent permanent magnets oppose each other.

3. A structure according to claim 2, wherein each said permanent magnet is magnetized in an axial direction.

4. A structure according to claim 2, wherein each said permanent magnet is magnetized in a radial direction.

5. A structure according to claim 2, wherein said permeance means includes at least one metallic shim disposed between each of said adjacent permanent magnets.

6. A structure according to claim 5, further including metallic shims attached to respective ends of said stacked magnets.

7. A structure according to claim 6, wherein each said metallic shim has a high permeability.

8. A superconducting bearing, comprising:
   at least two permanent magnets stacked in opposing polarity, each said permanent magnet providing a magnetic field;
   at least one permeable metallic shim disposed between each pair of adjacent magnets to provide a gap that increases flux density gradient; and
   superconducting means having at least one surface in communication with the magnetic field from at least one of said adjacent magnets.

9. A bearing according to claim 8, wherein said superconducting means is made of Type II superconducting material.

10. A bearing according to claim 8, wherein each said metallic shim has a high permeability.

11. A bearing according to claim 9, further including metallic shims attached to respective ends of said stacked magnets.

12. A bearing according to claim 8, wherein said permanent magnets are annular magnets that are magnetized radially and stacked concentrically.

13. A bearing according to claim 8, wherein said permanent magnets are annular magnets that are magnetized axially and stacked axially.

14. A bearing according to claim 13, wherein said superconducting means includes a hollow cylinder made of a superconducting material, and wherein said annular permanent magnets are disposed within said hollow cylinder, a longitudinal axis of said annular permanent magnets being located along a longitudinal axis of said hollow cylinder.

15. A bearing according to claim 14, wherein said annular permanent magnets are rotated relative to said hollow cylinder, and wherein said bearing further comprises retaining means, surrounding said annular permanent magnets, for retaining said annular permanent magnets.

16. A bearing according to claim 14, wherein said annular permanent magnets have diameters between 0.25 inches and 0.50 inches, and wherein said hollow cylinder and said permanent magnets have a clearance no greater than 0.020 inches.

17. A bearing according to claim 14, further including a tie rod which extends through said longitudinal axis of said annular permanent magnets and said at least one shim, said tie rod being having a high permeability.

18. A bearing according to claim 14, wherein said annular permanent magnets and said at least one shim are bonded together by a cryogenic-rated epoxy.

19. A journal bearing, comprising
   a stator including a hollow cylinder made of Type II superconducting material; and
   a rotor including at least two annular permanent magnets that are magnetized axially and stacked axially in opposing polarity, and at least one permeable metallic shim disposed between adjacent magnets to provide a gap that increases flux density gradient, said rotor being disposed within said hollow cylinder such that a longitudinal axis of said rotor is located along a longitudinal axis of said hollow cylinder.

20. A bearing according to claim 19, wherein said annular permanent magnets have diameters between 0.25 inches and 0.50 inches, and wherein said hollow cylinder and said permanent magnets have a clearance no greater than 0.020 inches.

21. A bearing according to claim 19, further comprising a sleeve surrounding said permanent magnets.

* * * * *